US008756704B2

(12) United States Patent
Castellucci et al.

(10) Patent No.: US 8,756,704 B2
(45) Date of Patent: Jun. 17, 2014

(54) USER IMPERSONATION AND AUTHENTICATION

(75) Inventors: Antonio Castellucci, Rome (IT);
Carmela Gambardella, Rome (IT);
Dario Iorfida, Rome (IT); Aniello Alessandro Rea, Rome (IT); Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/481,841

(22) Filed: Jun. 10, 2009

(65) Prior Publication Data

US 2010/0154043 A1    Jun. 17, 2010

(30) Foreign Application Priority Data

Dec. 15, 2008   (EP) .................................... 08171698

(51) Int. Cl.
*G06F 7/04* (2006.01)
(52) U.S. Cl.
USPC ......................................................... 726/28
(58) Field of Classification Search
USPC ........................................................ 726/28
See application file for complete search history.

(56) References Cited

U.S. PATENT DOCUMENTS

| 6,189,103 | B1 | 2/2001 | Nevarez et al. |
| 6,385,724 | B1 | 5/2002 | Beckman et al. |
| 6,772,137 | B1 * | 8/2004 | Hurwood et al. ..................... 1/1 |
| 7,225,256 | B2 | 5/2007 | Villavicencio |
| 7,392,536 | B2 * | 6/2008 | Jamieson et al. ................. 726/8 |
| 2001/0047477 | A1 * | 11/2001 | Chiang ........................ 713/170 |
| 2002/0048369 | A1 * | 4/2002 | Ginter et al. .................. 380/277 |
| 2002/0078365 | A1 | 6/2002 | Burnett et al. |
| 2003/0093524 | A1 * | 5/2003 | Goldick ........................ 709/225 |
| 2003/0105862 | A1 | 6/2003 | Villavicencio |
| 2003/0221124 | A1 * | 11/2003 | Curran et al. ................. 713/201 |
| 2004/0117489 | A1 | 6/2004 | Harmon et al. |
| 2005/0138375 | A1 * | 6/2005 | Sadjadi ........................ 713/167 |
| 2006/0123004 | A1 * | 6/2006 | Rapp ................................. 707/8 |
| 2007/0157298 | A1 * | 7/2007 | Dingwall et al. ................. 726/8 |

FOREIGN PATENT DOCUMENTS

| CN | 1567321 | 1/2005 |
| JP | H0417041 | 1/1992 |
| JP | H06161861 | 6/1994 |
| JP | 2008299702 | 12/2008 |

OTHER PUBLICATIONS

Eswaran, K P et al; "The Notions of Consistency and Predicate Locks in a Database System;" Communications of the Association for Computing Machinery; Nov. 1, 1976; pp. 624-633; vol. 19, No. 11; New York, New York, US.

(Continued)

*Primary Examiner* — Krista Zele
*Assistant Examiner* — Esther Benoit
(74) *Attorney, Agent, or Firm* — D'Ambrosio & Menon, PLLC; Usha Menon (57) ABSTRACT

Methods, systems, and computer program products for modifying a resource by an authenticated user impersonating another user. In one embodiment of the invention, a lock may be acquired on the resource to be modified, storing the identity of the authenticated user and the identity of the impersonated user inside the lock object, and generating a message indicating that the lock was acquired successfully by the authenticated user impersonating another user.

17 Claims, 4 Drawing Sheets

(56) References Cited

OTHER PUBLICATIONS

"Authorization Concepts and Solutions for J2EE Applications"; Ilechko, Paul; Kagan, Mannie; Jul. 2006; International Business Machines Corporation, USA; http://www.ibm.com/developerworks/websphere/library/techarticles/0607_ilechko/0607_ilechko.html.

SIPO Office Action dated Jun. 26, 2013 for co-pending related application No. 200980152043.0.

* cited by examiner

USER IMPERSONATION AND AUTHENTICATION

PRIORITY

This application is based on and claims the benefit of priority from European Patent Application No. 08171698.7, filed Dec. 15, 2008.

BACKGROUND

User authentication has long been delegated to specialized components in an IT environment. However, user authorization for accessing a resource is still generally managed by the same application managing resources because the authorization process very much depends on the business logic and on the details of the resources managed by the application. As the complexity of applications increases, these applications should take into account an increasing number of users and classes of users, each having very different needs with respect to the application. Hence the user interface, the functionality, and the business data available to a particular user depend on a lot of factors.

SUMMARY

Embodiments of the invention include methods, computer program products and systems for accessing a particular resource on a computer system. One embodiment of the method includes receiving a first identity object comprising a first identification element and a second identification element, each identification element uniquely identifying respectively a first and second user declared in a computer system, the first and second users being different; receiving a first request from the first user for modifying the resource; sending a first message to verify whether the second user is authorized to modify the resource, the first message comprising the second identification element and a reference to the resource; receiving a second message indicating on the basis of the verification whether the second user is authorized to modify the resource; and setting a first lock annunciator if the second user is authorized to modify the resource, the lock annunciator comprising the first and second identification elements. The first lock annunciator is adapted to indicate that the resource is locked to confirm or evidentiate that the resource is locked by the first user while impersonating the second user. This facilitates system security as it keeps track of who is modifying a resource while impersonating another user.

The method may further include receiving an identity verificator for the first user; sending a third message to authenticate the first user, the third message comprising the first identification element and the identity verificator; and receiving a fourth message indicating, on the basis of the authentication, whether the first user is authenticated. The first identification element is a user name, and the identity verificator is a password.

The authentication can be performed by a system external to the system executing the method.

The method may also include receiving a fifth message, when the second user is authorized to modify the resource, the fifth message indicating that the resource is already locked by a second lock annunciator comprising a third and a fourth identification element; verifying that the first and the third identification elements match, and verifying that the second and the fourth identification elements are different.

The lock can be reassigned to the authenticated user whereas it was first acquired by the impersonated user. This may be used in a support environment where the impersonated user cannot release the lock because of a problem with his account.

The method further includes sending a second request comprising a sixth message, the sixth message comprising the first and second identification elements, a reference to the resource and a timestamp, wherein the second request provides instructions to log in an audit trail the sixth message.

Therefore, unlike environments where the audit trail would track that the authenticated user modified the resource, not taking into account the particular situation of the impersonating function, in this embodiment of the invention, the application keeps track of who modified the resource.

The details of one or more embodiments of the invention are set forth in the accompanying drawings and the description below. Other features of embodiments of the invention will be apparent from the description and drawings, and from the claims.

DETAILED DESCRIPTION

Figure 1:
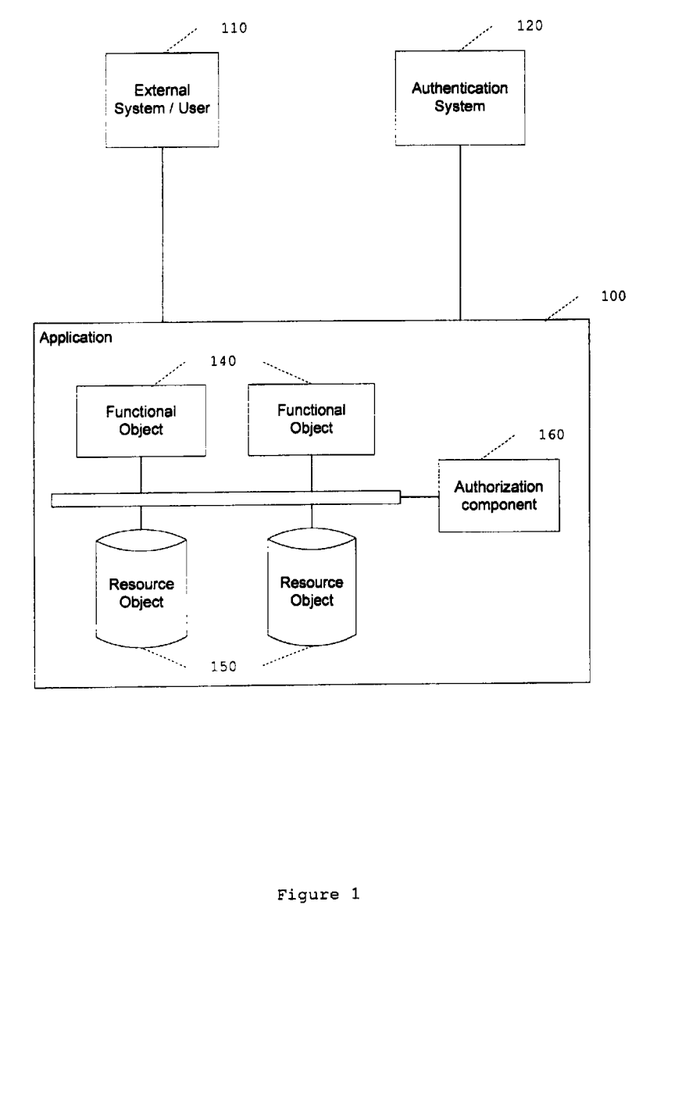
FIG. 1 is a schematic representation of a system capable of implementing an embodiment of the invention.

FIG. 1 shows a system according to one embodiment of the present invention, comprising: an application 100; a user or an external system 110; and an authentication system 120. The application comprises functional objects 140; resource objects 150; and an authorization component 160.

The application 100 can be any computer application managing resources in a secured environment. The application provides access to a set of resources 150 which may be stored in a database. The application 100 may also provide business logic and a graphical user interface implemented by functional objects 140. The external system or user 110 wanting to access a resource object 150 or wanting to apply a business logic contained in a functional object 140 may first be authenticated by the authentication system 120. The external system or user 110 provides an identification element uniquely representing the external system or user 110 in the application 100. The identification element may be a username, but it can also be an e-mail address or any number. The external system or user 110 will also provide another element for verifying that the claimed identity is authentic. This element is typically a password, but it can also be a user characteristic such as a biometric measure, or an ID stored in a user's token. These elements will be matched against an identity object corresponding to that user and previously stored in the system. The authentication system 120 is responsible for verifying the identity of the user. The authentication system 120 is typically an LDAP, access-controlled, and external to the application 100, but can also be a component of the application 100.

Once the identity of the user 110 has been verified, the application 100 will allow the authorized user 110 to access the requested object 150 or to execute the business logic contained in the requested functional object 140. The resource object 150 may be stored in short-term or long-term storage means. It may be implemented in various forms, including a database entry or file, for example. The business logic can be implemented by various means, including an object-oriented language, a procedural language, or a functional language, for example. The authorization may be based on user 110 rights in the application 100. Authorization can take various forms, such as role-based where the rights can be defined based on the fact that the user 110 is a member of a particular class, or instance-based where the rights can also be defined at the resource level by means of an ACL (access control list), for example. The authorization component 160 may be a part of the application 100, external to the application 100, or a combination of both. For example, a role-based authorization may be implemented external to the application 100 in a J2EE environment. However, an instance-based authorization may be implemented within the application 100 as this type of authorization is tied to the specific business logic implemented in the application 100. Checking that the user 110 is authorized to access a particular resource may be accomplished by sending a request to the authorization component 160, providing the user's 110 identity, and providing an identifier of the object to which access is requested. In an embodiment of the invention, the authenticated user 110 may act on behalf of another user previously declared in the system. This may be required when a system administrator wants to solve a problem that another user is experiencing with the application.

In an embodiment of the present invention, the application 100 may allow the external user 110 to impersonate another user. This capability may be restricted to certain users such as administrators. A user may also give this capability to another user ad hoc. In an embodiment of the invention, when the external user 110 attempts to access a resource object 150 or functional object 140 while impersonating another user, authorization to access these objects will be determined against the identity of the second user. Thus all the elements at the user interface level, at the business logic level, or at the data level, that are specific to a particular user and that require some kind of authorization, will appear to the external user 110 as if he were connected to the system as the impersonated user.

Figure 2:
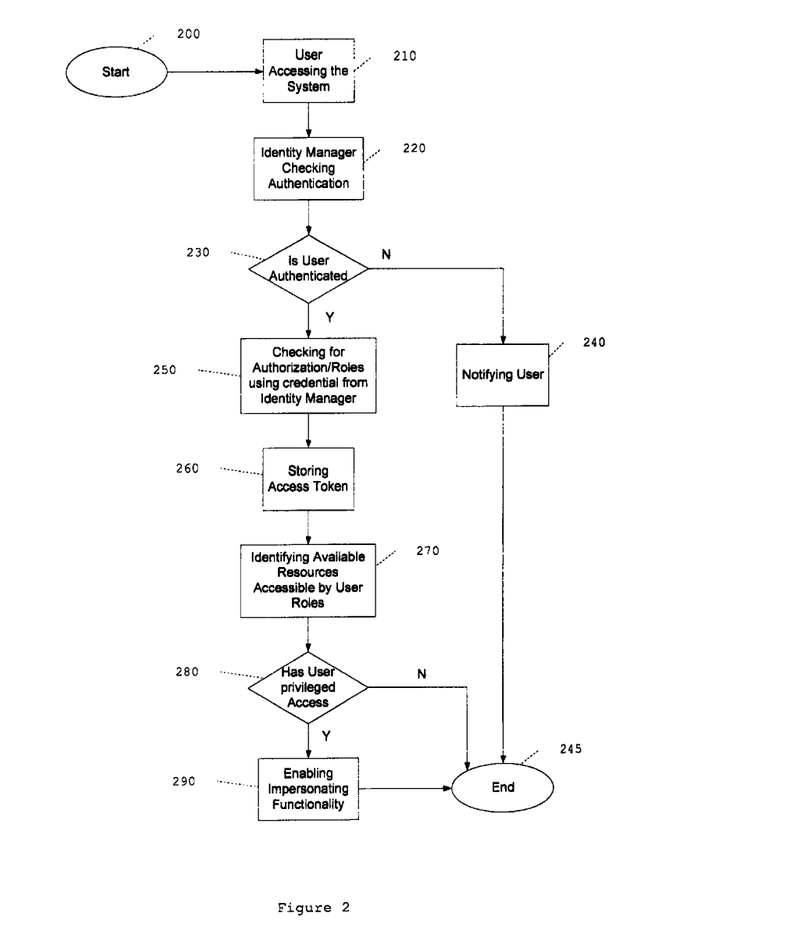
FIG. 2 is a flowchart showing a high-level process for authenticating and authorizing a user to access a particular resource according to an embodiment of the invention.

In another embodiment of the invention, as shown in FIG. 2, a high-level process for authenticating and authorizing a user to access a particular resource according to an embodiment of the present invention comprises: a start activity 200; an activity during which the user is accessing the system 210; an activity during which an identity manager authenticates the user 220; a decision activity verifying whether the user is authenticated 230; if the user is not authenticated, notifying the user of the authentication error 240 and ending the process 245; if the user is authenticated, checking for authorization all roles utilizing user credentials from the identity manager 250; storing the access token 260; identifying available resources accessible by user roles 270; a decision activity verifying whether the user has privileged access 280; if the user does not have privileged access, ending the process 245; and if the user does have privileged access, enabling the impersonation functionality 290 and ending the process 245.

When a user attempts to access an application 100 or a system 210, the user may provide a proof of identity. This is usually a username and password. The username can be an e-mail address, a number, or any value uniquely representing the user in the system 210 or in the application 100. A password allows for verification that the user requesting access is authentic. Once the user is authenticated, the authentication system 120 may create a user session object that will be used in subsequent user requests to the system 210 or the application 100. The user session object typically has a timeout value and cannot be shared between different client systems. In an embodiment of the present invention, the user session object comprises an authenticatedUserSN field for storing the identifier uniquely representing the authenticated user in the system, such as a user ID, and an authorizedUserSN field for storing the identifier uniquely representing a user that the authenticated user will impersonate. The user session object is created once the user is successfully authenticated 230. At creation the authenticatedUserSN and the authorizedUserSN are set to the same value: the user ID of the authenticated user. The application 100, knowing the identity of the user, determines the available resources accessible by the user 270 based on the role associated with the user, access control lists associated with the resources, and other authorization rules found in many modern applications. In an embodiment of the present invention, the capability of impersonating another user 290 is restricted to users with an administrator role 280.

Execution of the impersonating functionality requires inputting the identity of a second user. The authorizedUserSN field of the access token is set with the user ID of the second user provided as input. The authenticated user can arbitrarily choose the second user. Alternatively, the second user can be chosen in accord with a predefined rule based on, for example, the authenticated user, the resource type, the resource itself, or the current time. These predefined rules improve security associated with the functionality because fewer choices would be available. The capability to impersonate another user can also be restricted based on a particular situation such as a support task, normally executed during regular office hours.

An embodiment of the invention allows for the creation of a special class of users, in addition to the administrator class, with access to the impersonating functionality. For example, support users may be given access to this functionality.

Figure 3:
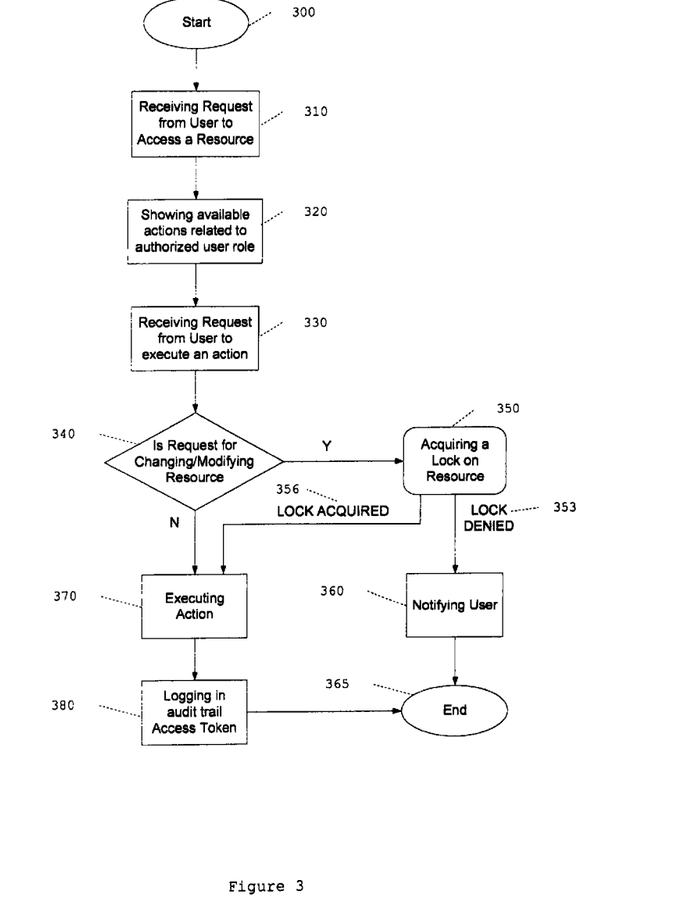
FIG. 3 is a flowchart showing a process for managing the modification of a resource by a user according to an embodiment of the invention.

FIG. 3 shows a process for managing the modification of a resource by a user, according to one embodiment of the invention, comprising: a start activity 300; receiving a request from the user to access a resource 310; showing available actions related to the authorized user's role 320; receiving a request from the user to execute an action 330; determining whether the request is for changing or modifying the resource 340; if the request is not for changing or modifying the resource, executing the action 370, logging in an audit trail the action along with the access token 380, and ending the process 365; if the request is for modifying or changing the resource, acquiring a lock on the resource 350; if the lock is acquired 356, executing the action 370, logging in an audit trail the action along with the access token 380, and ending the process 365; if the lock is denied 360, notifying the user 360 and ending the process 365.

During this process, the user browses through the list of available resources accessible to the user 210. The user's set of accessible resources is based on the value of the authorizedUserSN in the user session object. The application 100 uses the value in the authorizedUserSN field to query all roles granted to the user with respect to the selected resource. For each role returned as a result of the query, the application 100 adds the actions associated with that role into a cumulative set of actions. The authenticated user also sees the available actions for a particular resource object 150. The user can then be authorized to modify a resource whereas such action would not be available to him if he were not impersonating another user. Modifying an application to take into account the authorizedUserSN field of the user session object to authorize access to a resource can be done in the authorization component 160. Determining whether a user is authorized to change a resource 340 can be achieved by searching in the access control list associated with that resource, and checking whether the user belongs to the access control list with a sufficient permission level, such as write access. Some applications allow for an intermediate permission such as a link permission, allowing the user to modify the resource itself that can change a link associated with the resource. When modifying a resource or a link associated with a resource, a lock on the resource may be acquired to prevent concurrent modification of the resource. The process of acquiring a lock on the resource 350 in an embodiment of the present invention will be described in more detail in FIG. 4. The outcome of this process may be twofold: either the lock is denied 353 because, for example, another user is already modifying the resource and has previously acquired a lock on it, in which case the user is notified 360 that the resource cannot be modified at the moment and the process ends; or the lock is acquired 356 and the user can execute the modification action 370. The lock is released after the resource is modified. Most recent applications will monitor modifications of the resources they manage and log into an audit trail relevant information that will allow tracking the changes 380. In an embodiment of the present invention, the application 100 will log into the audit trail; the authenticated user identifier, the impersonated authorized user identifier, a reference to the modified resource, the reference uniquely identifying the resource in the system, and a timestamp for accurately determining when the modification occurred. Additional information can also be stored in the audit trail, including a description of the resource and a tag indicating that the modification was performed by a user impersonating another user. Inclusion of this additional information would be useful if someone desires to run a search on the audit trail for any impersonation activities.

Figure 4:
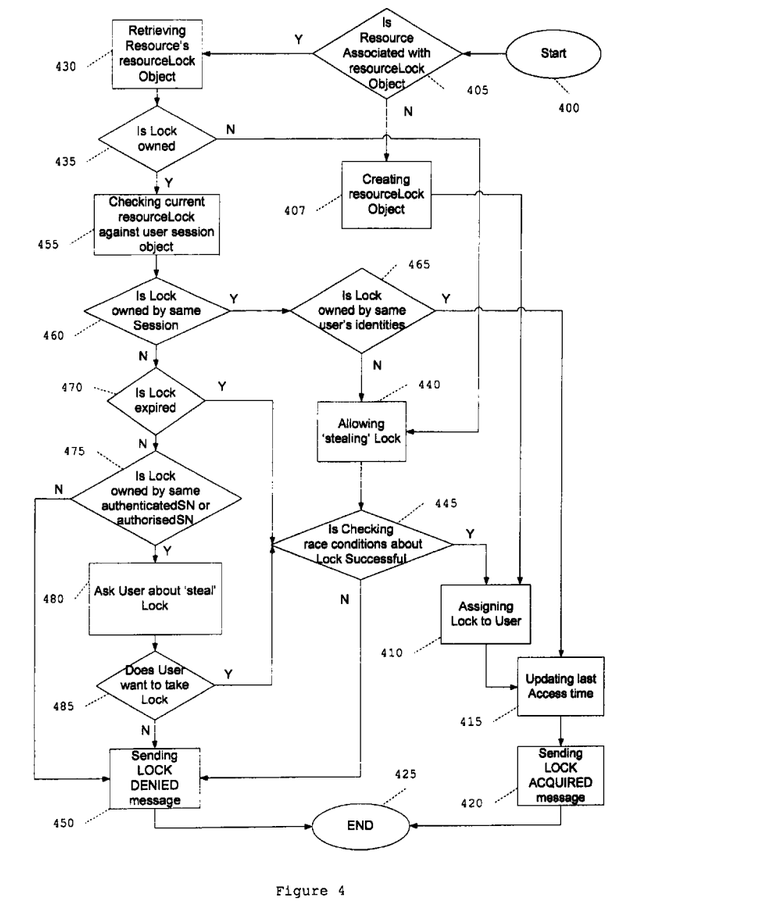
FIG. 4 is a flowchart showing a process for managing the modification of a locked resource by a user according to an embodiment of the invention.

In another embodiment of the invention, as depicted in FIG. 4, a process for managing the modification of a locked resource by a user comprises a start activity 400; checking whether the resource is associated with a resource lock object 405; if the resource is not associated with a resource lock object 405, creating a resource lock object 407 and assigning it to the user 410, updating last access time 415, sending a lock acquired message 420 and ending the process 425; if the resource is associated with a resource lock object 405, retrieving the lock object associated with the resource 430; checking whether the lock is owned 435; if the lock is not owned, allowing stealing the lock object 440, determining whether the checking of race conditions about the lock object is successful 445; if this determination is not successful sending a lock denied message 450; if this determination is successful, assigning the lock to the user 410, updating the last access time 415, sending the lock acquired message 420, and ending the process 425; if the lock is owned, checking the current lock object against the user session object 455; determining whether the lock is owned by the same session 460; if the lock is owned by the same session, determining whether the lock is owned by the same user's identities 465; if the user identities are the same, updating the last access time 415 and sending the lock acquired message 420; if the user identities are different, allowing stealing the lock object 440, determining whether the checking of the race conditions about the lock is successful 445, and executing all the activities following that determination already described above; if the lock is not owned by the same session, determining whether the lock has expired 470; if the lock has expired, determining whether the checking of the race conditions about the lock is successful 445 and executing all the activities following that determination already described above; if the lock has not expired, determining whether the lock is owned by the same authenticatedSN or authorizedSN: if the lock is not owned by the same user IDs, sending the lock denied message 450; if the lock is owned by the same user IDs, asking the user whether to steal the lock 480; determining the response of the user about whether to steal the lock 485; if the user wants to steal the lock, determining whether the checking of the race conditions about the lock is successful 445 and executing all the activities following that determination already described above; if the user does not want to steal the lock, sending the lock denied message 450.

Before a resource 150 can be modified, the application 100 should make sure that no concurrent modification of the resource can occur. A typical mechanism is to associate a lock object with the resource, thus indicating that a write is occurring on the resource, and preventing other users from contemporaneously writing to the resource. In an embodiment of the present invention, the lock object comprises the authenticatedUserSN and authorizedUserSN fields to support the impersonating functionality. The lock object can also comprise a session ID field to identify the active session at the time the lock was obtained. The session ID field can be copied from the user session object. The lock object can further comprise a timeWhenAcquired field indicating the time the lock was acquired in the corresponding resource, a timeWhenLastAccessed field indicating the time the last action, either read or write, was performed on the resource while the lock on the resource was active, and a reference to the resource controlled by the lock object. If the resource is not already locked, then the user can safely acquire a lock 407 on the resource and set all the relevant parameters in the lock object 415. The values of the fields authenticatedUserSN and authorizedUserSN are then copied to the lock object from the corresponding fields in the user session object. If the authenticated user is impersonating another user, this will be reflected in the resource lock object.

If the resource 150 is already protected by a resource lock object, the application 100 will attempt to reassign the lock object to the current user, taking into account that the current user may be impersonating another user.

The application 100 first checks whether the existing lock object is owned 435, particularly by analyzing the fields of the existing lock object. If the lock object is not owned, meaning some fields such as the authenticatedUserSN and authorizedUserSN are blank, the application can safely assign the resource lock object to the user 410 and set the lock object with the appropriate field values 415. In particular, the values of the fields authenticatedUserSN and authorizedUserSN are copied from the corresponding fields in the user session object.

If the lock is already owned, then the application 100 checks the values of the fields in the resource lock object against the values of the fields in the user session object 455. If the session ID field value of the resource lock object matches the session ID field value of the user session object, and if the authenticatedUserSN fields in the user session object and in the resource lock object match (during the same session the authenticated user made a request to impersonate another user and get a lock on the object prior to that request), then the identities of the user requesting a lock on the object are the same 465 and it is safe to allow stealing the lock object 440, even if the authorizedUserSN fields are different. Before assigning the lock to the current user, the application 100 checks that another session is not attempting to win a race condition to acquire the same lock 445. If another session did not win a race condition to acquire the same lock 445, then it is safe to assign the lock to the user 410 and update the relevant fields of the lock object 415. However, if another session won a race condition to acquire the same lock 445, then it is not possible to acquire the lock on the resource and the lock denied message should be generated 450.

If the lock is owned by another session, the application 100 checks whether the lock is still active or expired 470. If it is expired, it may be safe to assign the lock to the current user. The application 100 should check again about the race conditions to acquire the lock 445 as described above.

If the lock is not expired, the situation should be analyzed further. If the entity indicated by the field authenticatedUserSN of the lock object matches the corresponding field in the session object, then this lock was obtained by the same user in a different (likely interrupted) session. In this case, it is appropriate to ask the user about stealing the lock 480. If the identities in the authenticatedUserSN field are different, then the user takes into account the value of the authorizedUserSN field. If the value of the authorizedUserSN field in the user session object matches the value of the authenticatedUserSN or authorizedUserSN in the resource lock object, then the user being impersonated by the authenticated user, or another user impersonating this other user (such as another person from the support team), tried to modify the resource and got a lock object on it. It may then be appropriate to steal the lock object and reassign it to the current authenticated user, as these other users may not be able to access a resource any more. The current user is asked whether to steal the lock 480. If he accepts 485, the stealing of the lock is then logged into the audit trail. If the user refuses, then the lock denied message is generated 450.

If the value of the authorizedUserSN field in the user session object does not match the value of the authenticatedUserSN or authorizedUserSN in the resource lock object, then the lock cannot be acquired and the lock denied message is generated 450.

In even case where the user decides to steal the lock, the next step is to check the race conditions 445 as described above. If another session did not win a race condition to acquire the same lock 445, then the lock is assigned to the current user 410, the relevant fields of the lock object are updated 415 and the lock acquired message is generated 420.

Another embodiment of the present invention comprises a method for impersonating another user in a web application, comprising the steps of: authenticating the user with an external access management system, stirring the user identity in the field authenticatedUser of a data control block associated with the current user session, associating application roles with the authenticated user by the coordinated action of the external access management system and of the application container, enabling different functions for different authenticated users as a function of the roles which have been granted to the user upon authentication, enabling the impersonating function; and upon execution of the impersonating function receiving the identity (not the password) of a second user that the first user wants to impersonate, stirring this identity in an authorizedUserSN field of a data control block associated with the current user session. The application user interface reflects information that is customized for impersonated user.

Yet another embodiment of the present invention comprises modifying a resource by an authenticated user impersonating another user. In one embodiment of the invention, a lock may be acquired on the resource to be modified, storing the identity of the authenticated user and the identity of the impersonated user inside the lock object, and generating a message indicating that the lock was acquired successfully by the authenticated user impersonating another user.

Embodiments of the present invention can take the form of a computer-implemented method, a system, an entirely hardware embodiment, an entirely software embodiment or an embodiment containing both hardware and software elements. In one embodiment, the invention is implemented in software, which includes but is not limited to firmware, resident software, and microcode.

Furthermore, an embodiment of the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input output or I/O devices (including, but not limited to, keyboards, displays, and pointing devices) can be coupled to the system either directly or through intervening I/O controllers.

Network adapters may also be coupled to the system to enable the data processing system to become coupled to other data processing systems or remote printers or storage devices through intervening private or public networks. Cable modems and Ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

The invention claimed is:

1. A computer-implemented method for accessing a resource, the method comprising:
receiving a first identifier and a second identifier that uniquely identify a first user and a second user declared in a computer system, respectively, the first user being different from the second user;
authenticating the first user;
generating a user session object comprising the first identifier, the second identifier, and a session object identifier;
receiving a request to modify the resource from the first user;
determining whether the second user is authorized to modify the resource;

preventing the first user from modifying the resource responsive to a determination that the second user is not authorized to modify the resource;

responsive to a determination that the second user is authorized to modify the resource:

determining whether a lock object is associated with the resource, the lock object for preventing concurrent modification of the resource by more than one user, the lock object comprising a lock object session identifier, a lock object first identifier, and a lock object second identifier;

responsive to a determination that the lock object is not associated with the resource, generating a lock object, storing the session object identifier, the first identifier, and the second identifier as the lock object session identifier, the lock object first identifier, and the lock object second identifier, respectively, and assigning the generated lock object to the first user;

responsive to a determination that a lock object is already associated with the resource:

determining whether the lock object is owned by any user;

responsive a determination that the lock object is not owned, assigning the lock object to the first user and storing the session object identifier, the first identifier, and the second identifier as the lock object session identifier, the lock object first identifier, and the lock object second identifier, respectively;

responsive to a determination that the lock object is owned, determining whether a first set of criteria is satisfied for assigning the lock object to the first user; and responsive to a determination that the first set of criteria is satisfied, providing the first user with a capability to acquire the lock object.

2. The method of claim 1, wherein at least one of the generated lock object and the lock object acquired by the first user is adapted to indicate that the resource is locked by the first user while impersonating the second user.

3. The method of claim 1, the authenticating the first user further comprising:

receiving an identity verifier from the first user; and authenticating the first user based on a correspondence between the identity verifier and the first identifier.

4. A computer program product stored on a non-transitory computer readable medium, the computer readable medium comprising computer program instructions for accessing a resource, the computer program instructions comprising:

computer program instructions for receiving a first identifier and a second identifier that uniquely identify a first user and a second user declared in a computer system, respectively, the first user being different from the second user;

computer program instructions for authenticating the first user;

computer program instructions for generating a user session object comprising the first identifier, the second identifier, and a session object identifier;

computer program instructions for receiving a request to modify the resource from the first user;

computer program instructions for preventing the first user from modifying the resource responsive to a determination that the second user is not authorized to modify the resource;

responsive to a determination the second user is authorized to modify the resource:

computer program instructions for determining whether a lock object is associated with the resource, the lock object for preventing concurrent modification of the resource by more than one user, the lock object comprising a lock object session identifier, a lock object first identifier, and a lock object second identifier;

computer program instructions for, responsive to a determination that the lock object is not associated with the resource, generating a lock object, storing the session object identifier, the first identifier, and the second identifier as the lock object session identifier, the lock object first identifier, and the lock object second identifier, respectively, and assigning the generated lock object to the first user;

responsive to a determination that a lock object is associated with the resource:

computer program instructions for determining whether the lock object is owned by any user;

computer program instructions for, responsive to a determination that the lock object is not owned, assigning the lock object to the first user and storing the session object identifier, the first identifier, and the second identifier as the lock object session identifier, the lock object first identifier, and the lock object second identifier, respectively;

computer program instructions for, responsive to a determination that the lock object is owned, determining whether a first set of criteria for assigning the lock object to the first user is satisfied; and computer program instructions for, responsive to a determination that the first set of criteria is satisfied, providing the first user with a capability to acquire the lock object.

5. The computer program product of claim 4, further comprising computer program instructions associated with the generated lock object or the lock object acquired by the first user for indicating that the resource is locked by the first user while impersonating the second user.

6. The computer program product of claim 4, further comprising:

computer program instructions for receiving an identity verifier from the first user; and computer program instructions for authenticating the first user based on a correspondence between the identity verifier and the first identifier.

7. A system for permitting access to a resource, the system comprising:

one or more processors;

a memory operatively coupled to the one or more processors;

one or more nonvolatile storage devices accessible by the one or more processors; and an authentication and authorization tool for permitting a first user to access the resource, the authentication and authorization tool comprising computer program instructions that upon execution by at least one of the one or more processors cause the system to perform steps comprising:

receiving a first identifier and a second identifier that uniquely identify a first and second user declared in the computer system, respectively, the first user being different from the second user;

authenticating the first user;

generating a user session object comprising the first identifier, the second identifier, and a session object identifier;

receiving a request to modify the resource from the first user;

determining whether the second user is authorized to modify the resource;

preventing the first user from modifying the resource responsive to a determination that the second user is not authorized to modify the resource;

responsive to a determination that the second user is authorized to modify the resource:

determining whether a lock object is associated with the resource, the lock object for preventing concurrent modification of the resource by more than one user, and comprising a lock object session identifier, a lock object first identifier, and a lock object second identifier;

responsive to a determination that the lock object is not associated with the resource, generating a first user lock object, storing the session object identifier, the first identifier, and the second identifier as the lock object session identifier, the lock object first identifier, and the lock object second identifier, respectively, and assigning the generated lock object to the first user;

responsive to a determination that a lock object is associated with the resource:

determining whether the lock object is owned by any user;

responsive to a determination that the lock object is not owned, assigning the lock object to the first user and storing the session object identifier, the first identifier, and the second identifier as the lock object session identifier, the lock object first identifier, and the lock object second identifier, respectively;

responsive to a determination that the lock object is owned, determining whether a first set of criteria for assigning the lock object to the first user is satisfied; and responsive to a determination that the first set of criteria is satisfied, providing the first user with a capability to acquire the lock object.

8. The resource access system of claim 7, wherein the generated lock object or the lock object acquired by the first user is adapted to indicate that the resource is locked by the first user while impersonating the second user.

9. The resource access system of claim 7, further comprising computer program instructions that upon execution cause the system to perform additional steps comprising:

receiving an identity verifier from the first user; and authenticating the first user based on a correspondence between the identity verifier and the first identifier.

10. The method of claim 1, the first set of criteria comprising:

correspondence between the session identifier of the user session object and the session object identifier of the lock object;

correspondence between the lock object first identifier and the first identifier; and absence of another session object attempting to win a race condition to acquire the lock object.

11. The method of claim 10, further comprising:

determining a status of the lock object, the status selected from the group consisting of: expired and active, responsive to a determination that the session identifier of the user session object does not correspond to the session object identifier of the lock object;

determining whether another session object is attempting to win a race condition to acquire the lock object responsive to a determination that the lock object is expired; and providing the first user with a capability to acquire the lock object responsive to a determination that another session object is not attempting to win a race condition to acquire the lock object.

12. The method of claim 11, further comprising:

responsive to a determination that the session identifier of the user session object does not correspond to the session object identifier of the lock object and a determination that the lock object is active, determining whether the first identifier corresponds to the lock object first identifier;

determining whether another user is attempting to win a race condition to acquire the lock object; and responsive to a determination that the first identifier corresponds to the lock object first identifier and a determination that another user is not attempting to win a race condition to acquire the lock object, providing the first user with a capability to acquire the lock object.

13. The method of claim 12, further comprising:

determining whether a second set of criteria is satisfied responsive to a determination that the first identifier does not correspond to the lock object first identifier;

providing the first user with a capability to acquire the lock object responsive to a determination that the second set of criteria is satisfied; and preventing the first user from modifying the resource responsive to a determination that the second set of criteria is not satisfied, wherein the second set of criteria comprises:

correspondence between the second identifier and the lock object first identifier, or correspondence between the second identifier and the lock object second identifier.

14. The system of claim 7, the first set of criteria comprising:

correspondence between the session identifier of the user session object and the session object identifier of the lock object;

correspondence between the lock object first identifier and the first identifier; and absence of another session object attempting to win a race condition to acquire the lock object.

15. The system of claim 14, the authentication and authorization tool further comprising computer program instructions that upon execution cause the system to perform additional steps comprising:

determining a status of the lock object, the status selected from the group consisting of: expired and active, responsive to a determination that the session identifier of the user session object does not correspond to the session object identifier of the lock object;

determining whether another session object is attempting to win a race condition to acquire the lock object responsive to a determination that the lock object is expired; and providing the first user with a capability to acquire the lock object responsive to a determination that another session object is not attempting to win a race condition to acquire the lock object.

16. The system of claim 15, the authentication and authorization tool further comprising computer program instructions that upon execution cause the system to perform additional steps comprising:

responsive to a determination that the session identifier of the user session object does not correspond to the session object identifier of the lock object and a determination that the lock object is active, determining whether the first identifier corresponds to the lock object first identifier;

determining whether another user is attempting to win a race condition to acquire the lock object; and responsive to a determination that the first identifier corresponds to the lock object first identifier and a determination that another user is not attempting to win a race condition to acquire the lock object, providing the first user with a capability to acquire the lock object.

17. The system of claim 16, the authentication and authorization tool further comprising computer program instructions that upon execution cause the system to perform additional steps comprising:

determining whether a second set of criteria is satisfied responsive to a determination that the first identifier does not correspond to the lock object first identifier;

providing the first user with a capability to acquire the lock object responsive to a determination that the second set of criteria is satisfied; and preventing the first user from modifying the resource responsive to a determination that the second set of criteria is not satisfied, wherein the second set of criteria comprises:

correspondence between the second identifier and the lock object first identifier, or correspondence between the second identifier and the lock object second identifier.

* * * * *